(12) United States Patent
Morrow

(10) Patent No.: US 10,773,624 B2
(45) Date of Patent: Sep. 15, 2020

(54) CUSHION-LENGTH ADJUSTER FOR VEHICLE SEAT

(71) Applicant: Faurecia Automotive Seating, LLC, Auburn Hills, MI (US)

(72) Inventor: Michael Morrow, Royal Oak, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 99 days.

(21) Appl. No.: 16/142,388

(22) Filed: Sep. 26, 2018

(65) Prior Publication Data

US 2019/0160990 A1 May 30, 2019

Related U.S. Application Data

(60) Provisional application No. 62/564,355, filed on Sep. 28, 2017.

(51) Int. Cl.
| | |
|---|---|
| *B60N 2/72* | (2006.01) |
| *B60N 2/62* | (2006.01) |
| *B60N 2/68* | (2006.01) |
| *B60N 2/02* | (2006.01) |
| *A47C 7/14* | (2006.01) |

(52) U.S. Cl.
CPC ............ *B60N 2/72* (2013.01); *B60N 2/0284* (2013.01); *B60N 2/62* (2013.01); *B60N 2/686* (2013.01); *A47C 7/14* (2013.01)

(58) Field of Classification Search
CPC .......... B60N 2/72; B60N 2/0284; B60N 2/62; B60N 2/686
USPC .................................................... 297/284.11
See application file for complete search history.

(56) References Cited

U.S. PATENT DOCUMENTS

| | | | |
|---|---|---|---|
| 4,401,343 | A | 8/1983 | Schmidt |
| 4,629,248 | A | 12/1986 | Mawbey |
| 5,082,326 | A | 1/1992 | Sekido |
| 5,171,062 | A | 12/1992 | Courtois |
| 5,622,406 | A | 4/1997 | Meschkat |
| 6,267,445 | B1 | 7/2001 | Marais |
| 6,419,317 | B1 | 7/2002 | Westrich |
| 6,454,353 | B1 | 9/2002 | Knaus |
| 6,601,918 | B2 | 8/2003 | Mattsson |
| 6,926,361 | B2 | 8/2005 | Link |
| 7,108,322 | B2 | 9/2006 | Erker |
| 7,192,087 | B2 | 3/2007 | Adragna |
| 7,571,964 | B2 | 8/2009 | Taniguchi |

(Continued)

FOREIGN PATENT DOCUMENTS

| | | |
|---|---|---|
| DE | 4104697 | 3/1997 |
| DE | 10112918 | 10/2002 |

(Continued)

OTHER PUBLICATIONS

International Search Report, Application No. PCT/KR2014/007284, dated Oct. 30, 2014.

(Continued)

*Primary Examiner* — Anthony D Barfield
(74) *Attorney, Agent, or Firm* — Barnes & Thornburg LLP

(57) ABSTRACT

An occupant-support base includes a seat pan and a seat pad. The seat pan and the seat pad cooperate to support an occupant thereon. The seat pad includes a fixed portion and a movable portion that is configured to move relative to the fixed portion.

15 Claims, 5 Drawing Sheets

(56) References Cited

U.S. PATENT DOCUMENTS

| | | |
|---|---|---|
| 7,578,554 B2 | 8/2009 | Lee |
| 7,611,201 B2 | 11/2009 | Moriyama |
| 7,669,928 B2 | 3/2010 | Snyder |
| 7,669,929 B2 | 3/2010 | Simon |
| 7,753,446 B2 | 7/2010 | Kubler |
| 7,874,621 B2 | 1/2011 | Gumbrich |
| 7,909,401 B2 | 3/2011 | Hofmann |
| 7,997,648 B2 | 8/2011 | Becker |
| 8,011,728 B2 | 9/2011 | Kohl |
| 8,128,167 B2 | 3/2012 | Zhong |
| 8,408,646 B2 | 4/2013 | Harper |
| 8,579,373 B2 * | 11/2013 | Pradier ............... B60N 2/0284 297/284.11 X |
| 8,991,921 B2 | 3/2015 | Peterson |
| 9,016,783 B2 | 4/2015 | Line |
| 9,016,784 B2 | 4/2015 | Line |
| 9,016,785 B2 | 4/2015 | Freisleben |
| 9,321,373 B2 | 4/2016 | Sakata |
| 9,365,142 B1 | 6/2016 | Line |
| 9,399,418 B2 | 7/2016 | Line |
| 9,421,885 B2 | 8/2016 | Wiegelmann |
| 9,527,417 B2 | 12/2016 | Dry |
| 9,809,132 B2 * | 11/2017 | Bortolon ............... B60N 2/0284 |
| 2008/0191531 A1 | 8/2008 | Hoffmann |
| 2008/0191532 A1 | 8/2008 | Wain |
| 2009/0091172 A1 | 4/2009 | Kim |
| 2013/0257126 A1 | 10/2013 | Freisleben |
| 2014/0292051 A1 | 10/2014 | Planson |
| 2015/0258914 A1 | 9/2015 | Lee |
| 2016/0304016 A1 | 10/2016 | Line |
| 2016/0339803 A1 | 11/2016 | Beuschel |
| 2016/0339805 A1 | 11/2016 | Kim |
| 2016/0339806 A1 | 11/2016 | Popescu |
| 2016/0339820 A1 | 11/2016 | Kajino |

FOREIGN PATENT DOCUMENTS

| | | |
|---|---|---|
| DE | 102007049863 | 7/2008 |
| DE | 102009019033 | 10/2010 |
| DE | 102008004121 | 4/2011 |
| DE | 102011116449 | 4/2013 |
| DE | 202012214296 | 2/2014 |
| DE | 102008049923 | 4/2014 |
| EP | 3095638 | 11/2016 |
| FR | 2969546 | 6/2012 |
| GB | 22522723 | 8/1992 |
| JP | 07013244 U | 3/1995 |
| JP | 2000157376 A | 6/2000 |
| JP | 2003002090 A | 1/2003 |
| JP | 2007130228 | 5/2007 |
| JP | 4438564 | 3/2010 |
| KR | 1020090035090 A | 4/2009 |
| KR | 2020110011890 U | 12/2011 |
| KR | 1020130064139 A | 6/2013 |
| WO | 2010057335 | 5/2010 |
| WO | 2012055698 | 5/2012 |
| WO | 2012107675 A1 | 8/2012 |
| WO | 2016120143 | 8/2016 |

OTHER PUBLICATIONS

Office Action dated Jan. 26, 2018 for U.S. Appl. No. 15/019,580; (pp. 1-8).

* cited by examiner

CUSHION-LENGTH ADJUSTER FOR VEHICLE SEAT

PRIORITY CLAIM

This application claims priority under 35 U.S.C. § 119(e) to U.S. Provisional Application Ser. No. 62/564,355, filed Sep. 28, 2017, which is expressly incorporated by reference herein.

BACKGROUND

The present disclosure relates to an occupant support, and particularly to a vehicle seat. More particularly, the present disclosure relates to a vehicle seat having movable portions.

SUMMARY

According to the present disclosure, an occupant-support base includes a seat pan and a seat pad. The seat pan and the seat pad cooperate to define a space between the seat pan and the seat pad.

In illustrative embodiments, the occupant-support base further includes a pad-extension system coupled to the seat pan and the seat pad. The pad-extension system includes a movable-seat pan located in the space, a movable-pan mount located in the space, and an actuator. The movable-seat pan is fixed to the movable-pan mount. The movable seat-pan and the movable-pan mount are configured to translate relative to the seat pan between a retracted configuration, in which the seat pad has a first occupant support base length, and an extended configuration, in which the seat pad has a second occupant-support base length. The second occupant-support base length is greater than the first occupant-support base length.

In illustrative embodiments, the movable-seat pan is fixed to the movable-pan mount. The movable-seat pan includes a mount plate coupled to the movable-pan mount and a seat-pad mover coupled to the mount plate. The seat-pad mover has an outwardly-facing surface that engages a movable portion of the seat pad. The seat-pad mover pushes the movable portion of the seat pad in a longitudinal direction as the pad-extension system changes from the retracted configuration to the extended configuration.

In illustrative embodiments, the movable-seat pan is formed to include a plurality of guide slots including a major guide slot, a first minor guide slot, and a second minor guide slot. A plurality of guide pins are arranged to lie in each of the guide slots to couple the movable-pan mount to the seat pan. The plurality of guide pins includes a first guide pin located in the major guide slot, a second guide pin located in the major guide slot, a third guide pin located in the first minor guide slot, and a fourth guide pin located in the second minor guide slot.

In illustrative embodiments, the movable-pan mount is formed to include an aperture defined by a perimeter. The actuator includes a rack coupled to a lateral wall of the perimeter, a pinion configured to engage the rack, and a motor configured to rotate the pinion about a pinion axis. The rack and the pinion each includes a plurality of teeth that interlock. The pinion is configured to push the rack as the pinion is rotated by the motor to move the movable-seat pan and the movable-pan mount between the retracted configuration and the extended configuration.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view, in accordance with the present disclosure, showing an occupant-support base including a seat pan, a seat pad coupled to the seat pan to define a space therebetween and adapted to support an occupant above the seat pan, and a pad-extension system configured to move the seat pad relative to the seat pan;

FIGS. 2 and 3 are a series of sectional views of the occupant-support base of FIG. 1 showing that the pad-extension system is configured to move the seat pad relative to the seat pan between a retracted configuration, in which the seat pad includes a first occupant-support base length, as shown in FIG. 2, and an extended configuration, in which the seat pad includes a second occupant-support base length that is greater than the first occupant support base length, as shown in FIG. 3;

Figure 5:
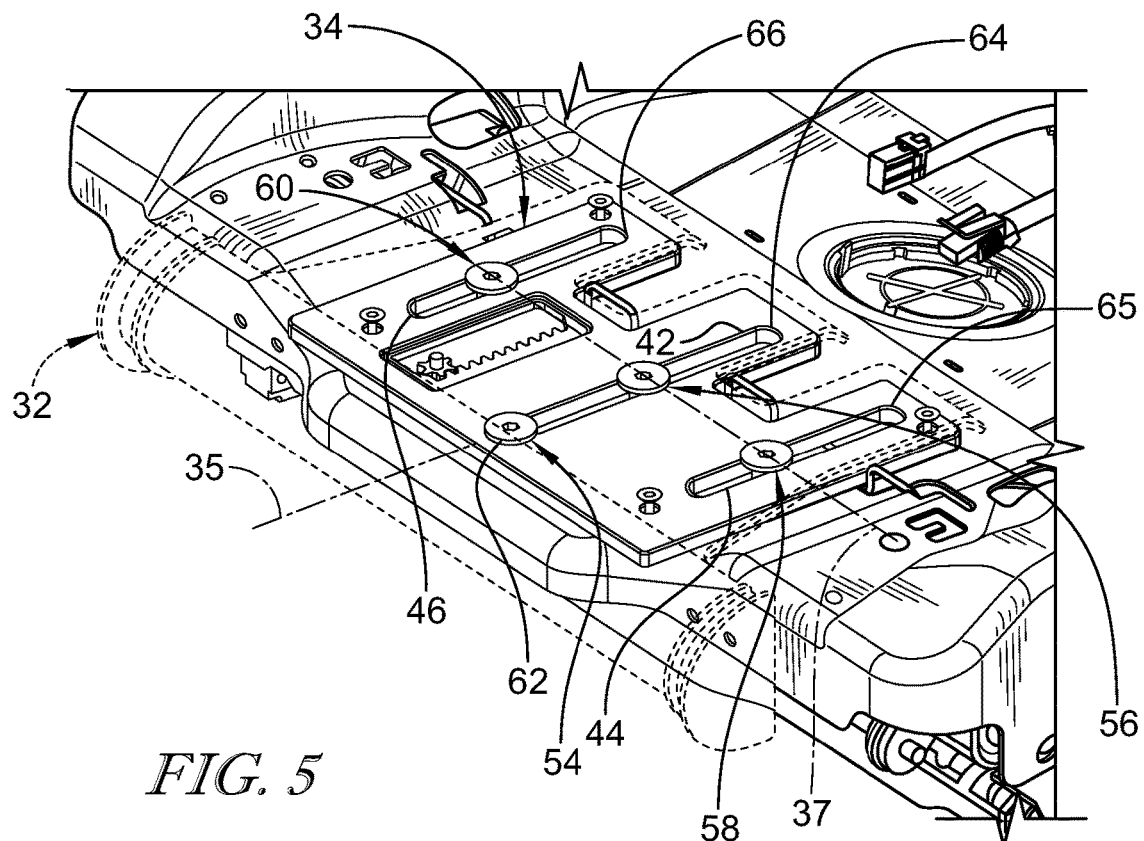
Figure 6:
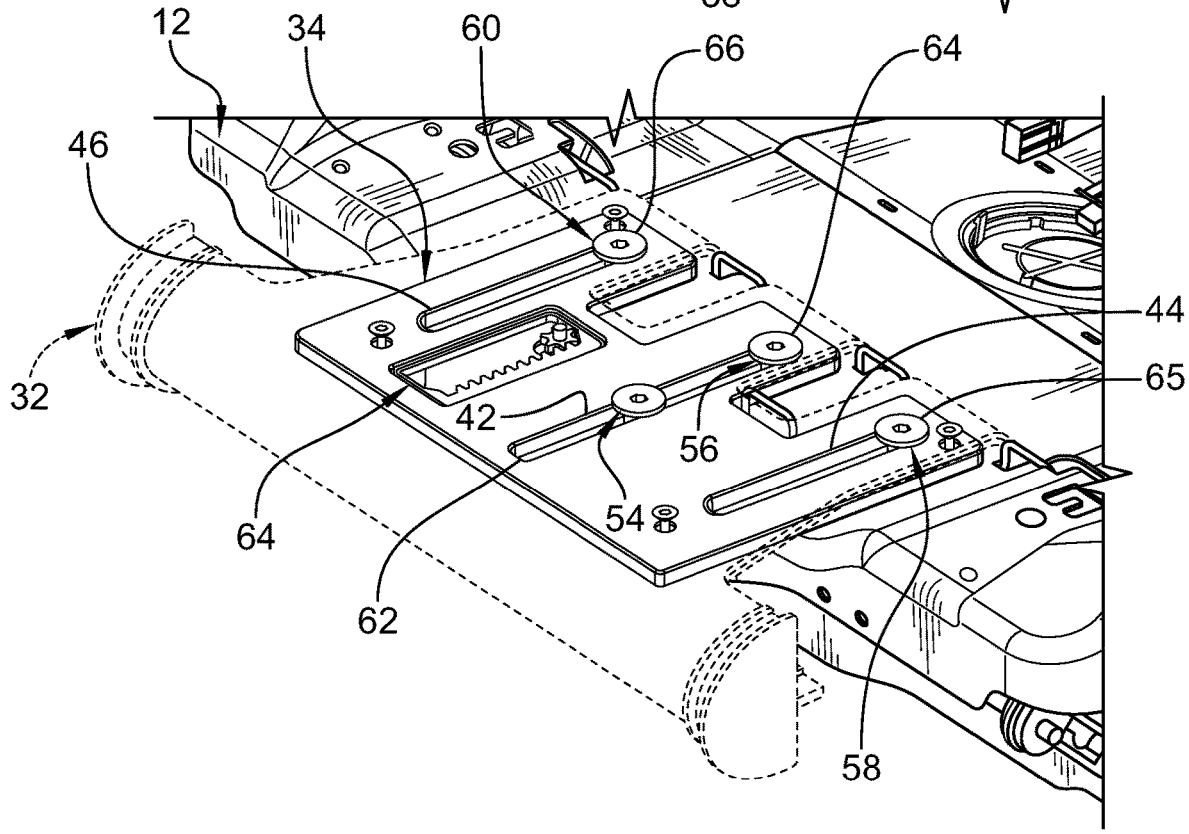
Figure 7:
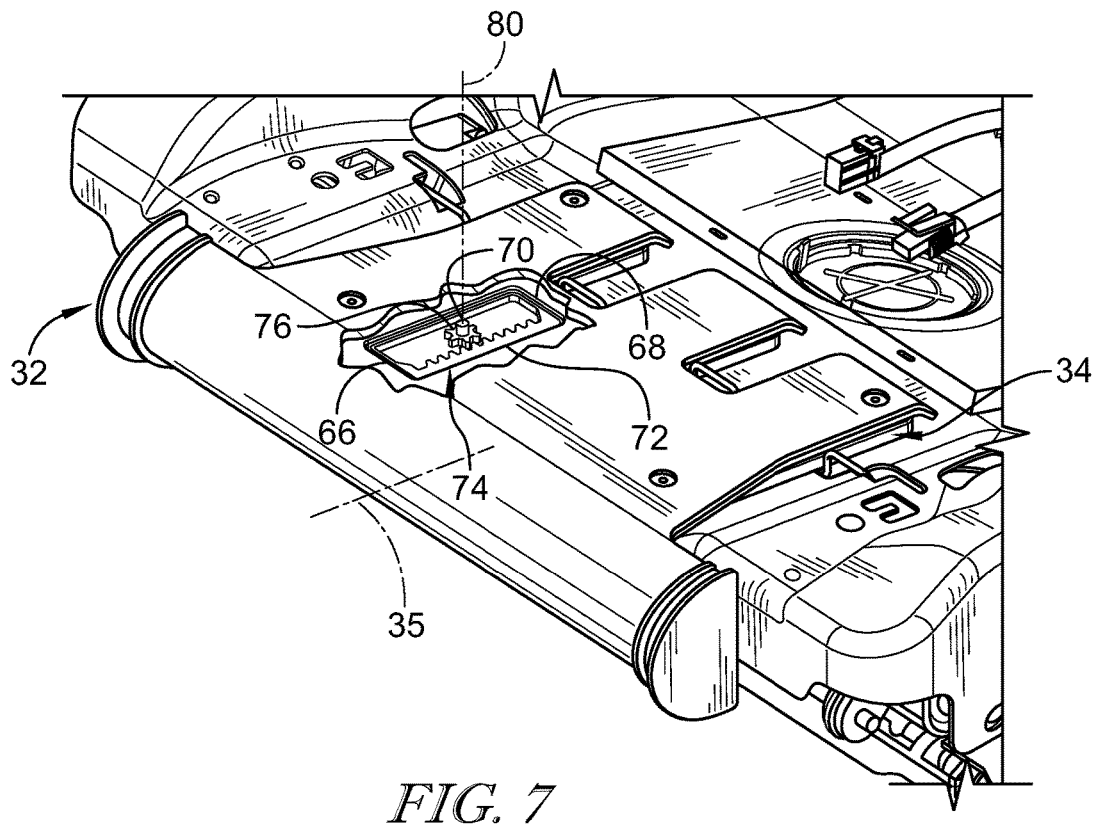
Figure 8:
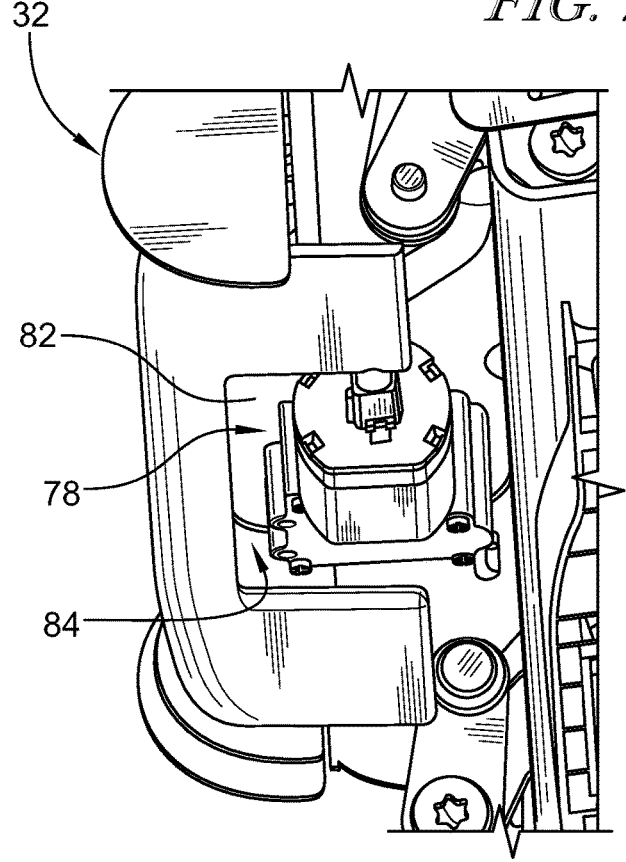
Figure 9:
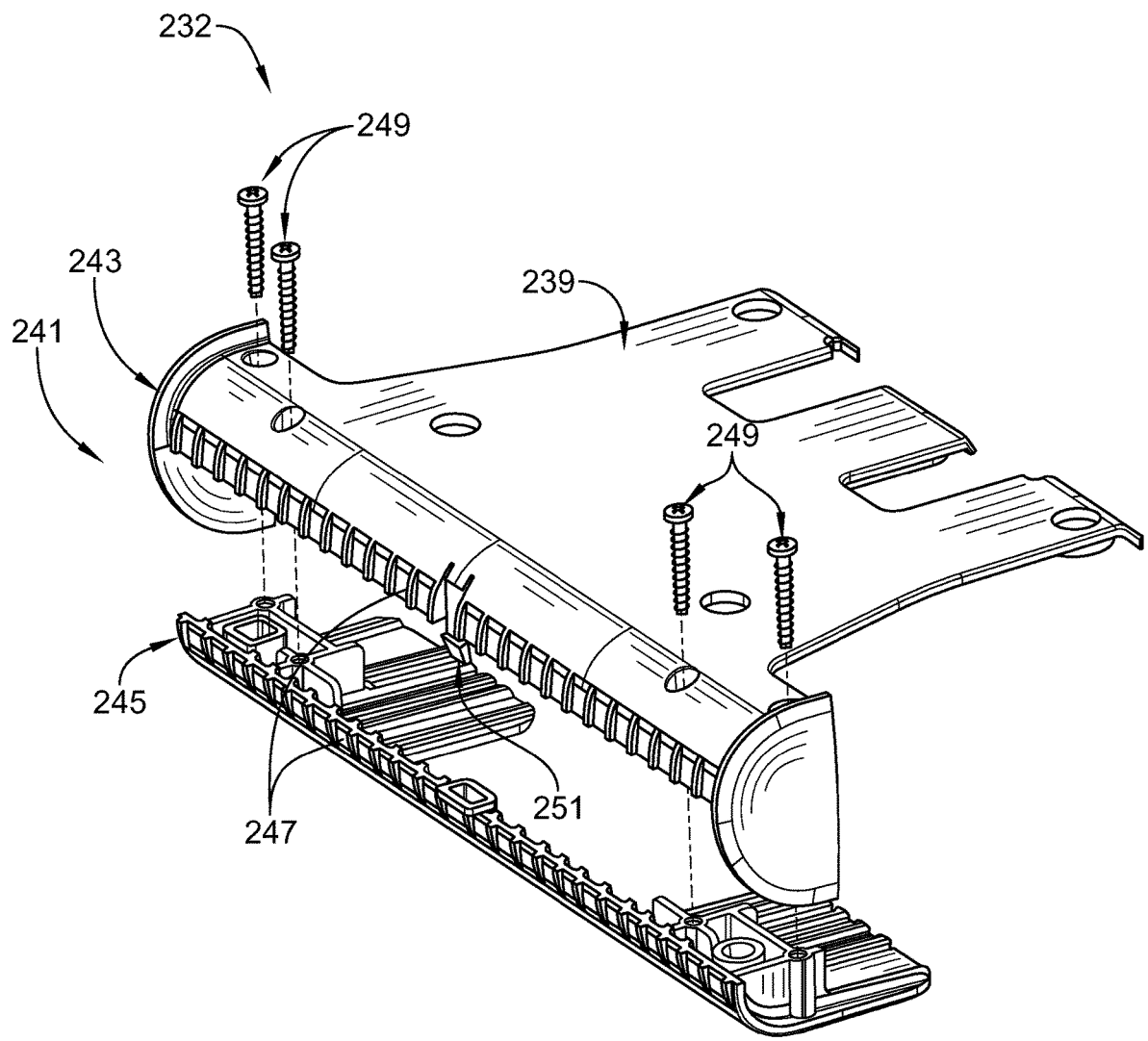

FIGS. 5 and 6 are a series of perspective views of the pad-extension system showing that the movable-pan mount is formed to include a plurality of guide slots that are configured to receive a plurality of guide pins and an actuator aperture that is configured to receive at least a portion of the actuator, and showing that the movable-pan mount is configured to translate relative to the seat pan and the guide pins from the retracted configuration, as shown in FIG. 5, to the extended configuration, as shown in FIG. 6;

FIG. 5 is a perspective view of the pad-extension system arranged in the retracted configuration such that at least one of the guide pins engages a forward end of a corresponding guide slot;

FIG. 6 is a perspective view of the pad-extension system arranged in the expanded configuration such that at least one of the guide pins engages an aft end of a corresponding guide slot;

FIG. 7 is a perspective view of the pad-extension system with a portion removed to show that the actuator includes a rack coupled to the movable-pan mount and a pinion that cooperates with the rack to move the movable-pan mount and the movable seat pan between the retracted configuration and the extended configuration;

FIG. 8 is a perspective view of the occupant-support base showing that the actuator further includes a motor coupled to an underside of the seat pan and showing that the movable-seat pan is formed to include a motor-receiving space that receives the motor when the pad-extension system is arranged in the retracted configuration; and FIG. 9 is an exploded assembly view of another embodiment of a movable-seat pan, in accordance with the present disclosure, showing that the movable-seat pan includes an upper part that is configured to engage the movable-pan mount and a lower part that is configured to be coupled to the upper part via a plurality of fasteners.

DETAILED DESCRIPTION

Figure 1:
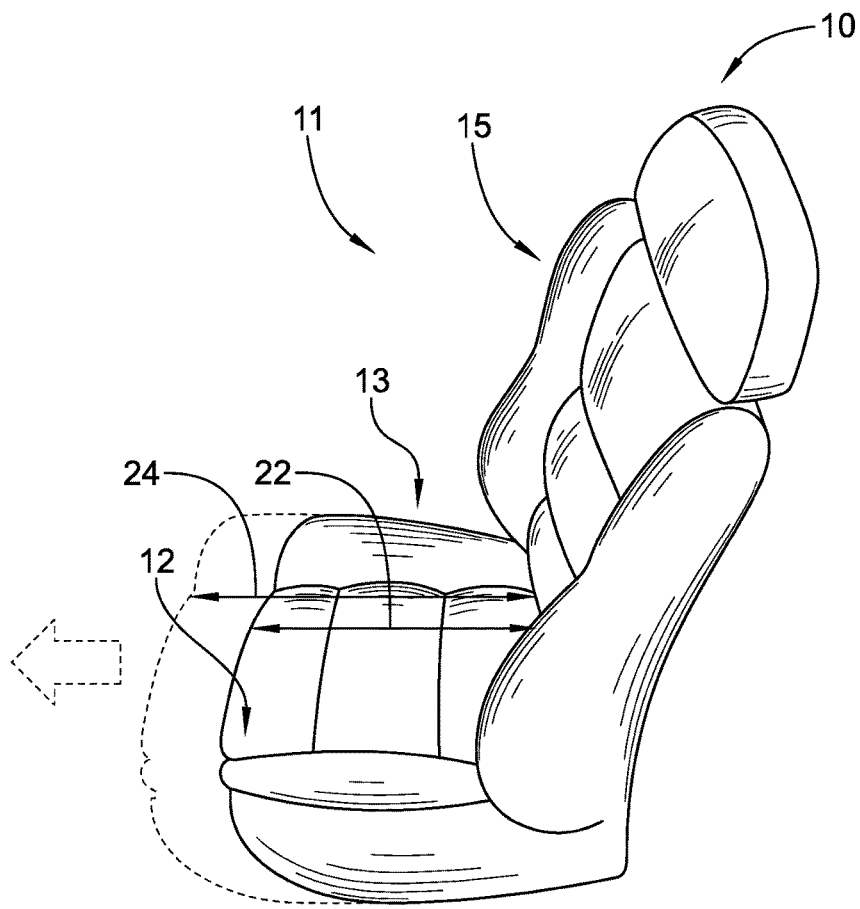
Figure 2:
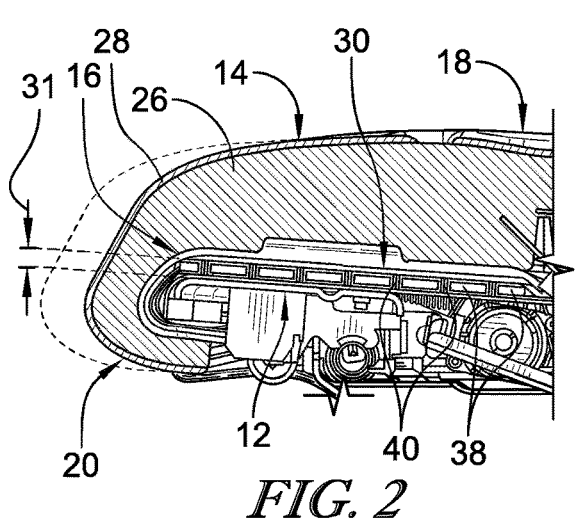
FIG. 2 is a sectional view of the occupant-support base arranged in the retracted configuration showing that the pad extension system includes a movable-seat pan located between the seat pan and the seat pad, a movable-pan mount located between the seat pan and the seat pad, and an actuator that is configured to change the seat pad from the retracted configuration to the extended configuration.
Figure 3:
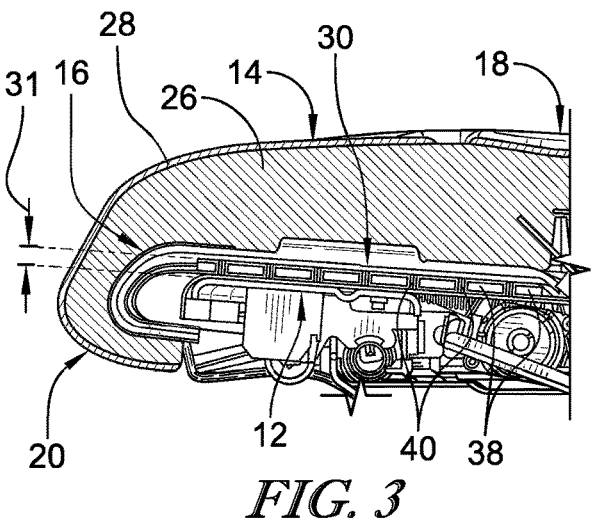
FIG. 3 is a sectional view of the occupant-support base arranged in the extended configuration showing that the movable-seat pad and the movable pan mount are configured to translate relative to the seat pan to move the seat pad relative to the seat pan such that a gap is formed between an outwardly-facing surface of the seat pan and an inwardly-facing surface of the movable-seat pan.

An occupant-support base 10, in accordance with the present disclosure, is shown in FIGS. 1-3. The occupant-support base 10 is configured to support an occupant thereon and includes a seat pan 12, a seat pad 14, and a pad-extension system 16. The seat pan 12 and the seat pad 14 cooperate to define a space 30 therebetween. In the illustrative embodiment, the space 30 is less than or equal to about 15 millimeters. The pad-extension system 16 includes a movable-seat pan 32 and a movable-pan mount 34 located in the space 30. An actuator 36 is configured to translate the movable-seat pan 32 and the movable-pan mount 34 through the space 30 relative to the seat pan 12 without using any guide rails or rollers as shown in FIGS. 5 and 6.

The occupant-support base 10 is illustratively embodied as a vehicle seat 11 that includes a seat bottom 13 and a seat back 15. The seat bottom 13 is arranged in generally parallel relation with a vehicle floor (not shown). The seat back 15 is arranged to extend upwardly from the seat bottom 13 and the vehicle floor. The pad-extension system 16 is illustratively embodied as a cushion-length adjuster for the seat bottom 13 of the vehicle seat 11, as shown in FIG. 1. In the illustrative example, the cushion length adjuster is configured to move a movable portion 20 of the seat pad 14 relative to the seat back 15. The movable portion 20 may be a distal end of the seat bottom 13. The pad-extension system 16 is configured to move the distal end inward and outward relative to the seat back 15. However, in other examples, the pad-extension system 24 may be used to move other parts of the vehicle seat 11, such as, a backrest, a headrest, or side bolsters as shown in FIG. 1.

As described above, the occupant-support base 10 includes the seat pan 12, the seat pad 14 coupled to the seat pan 12, and the pad-extension system 16 as shown in FIGS. 1-3. The seat pan 12 is fixed relative to the vehicle floor (not shown). The seat pad 14 includes a generally fixed portion 18 and a movable portion 20 that is configured to move relative to the seat pan 12 and the generally fixed portion 18. The pad-extension system 16 is configured to move the movable portion 20 of the seat pad 14 between a retracted configuration, as shown in FIG. 2, and an extended configuration, as shown in FIG. 3. In the retracted configuration, the seat pad 16 is defined by a first occupant-support base length 22. In the extended configuration, the seat pad 14 is defined by a second occupant-support base length 24 that is greater than the first length 22.

The seat pad 14 further includes a seat cushion 26 and a seat trim 28 as shown in FIGS. 2 and 3. The seat cushion 26 provides a comfortable surface to support an occupant seated thereon. The seat trim 28 overlays the seat cushion 26 and retains the seat cushion to the seat pan 12.

Figure 4:
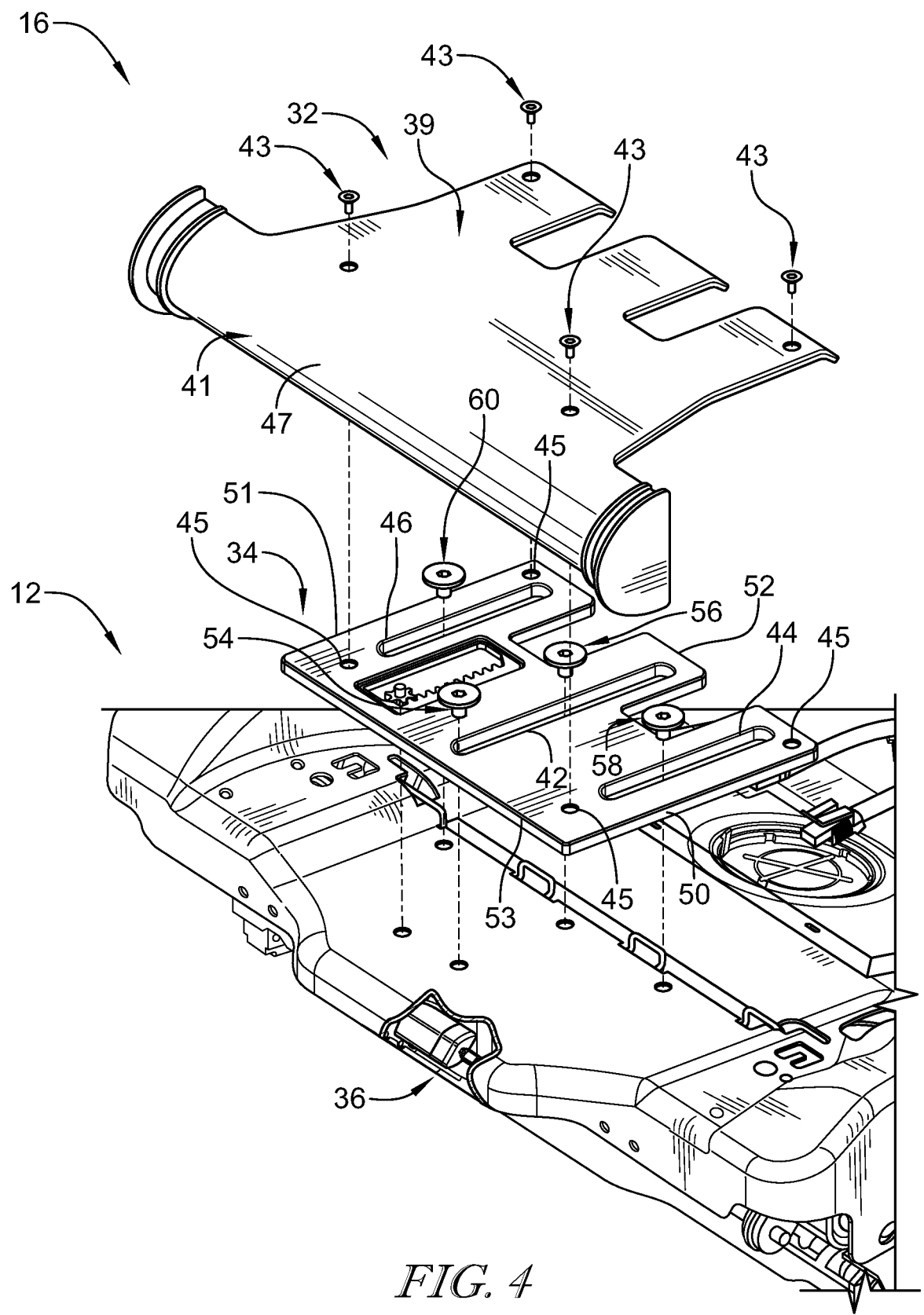
FIG. 4 is an exploded assembly view of the pad-extension system of FIGS. 1-3 showing that the pad-extension system includes, from top to bottom, the movable-seat pan, the movable-pan mount, and the actuator coupled to the seat pan.

The seat pan 12 and the seat pad 14 cooperate to define a space 30 between the seat pan 12 and the seat pad 14 as shown in FIGS. 2 and 3. The pad-extension system 16 is configured to minimize a thickness 31 of the space 30 between the seat pan 12 and the seat pad 14, as shown in FIGS. 2 and 3, and includes a movable-seat pan 32, a movable-pan mount 34, and an actuator 36 as shown in FIG. 4. The movable-seat pan 32 is located in the space 30 and is configured to move the movable portion 20 of the seat pad 14 between the retracted configuration and the extended configuration in a longitudinal direction 35. The movable-pan mount 34 is located in the space 30 and is configured to couple the movable-seat pan 32 to the seat pan 12. The actuator 36 is coupled to the seat pan 12 and is configured to cause the movable portion 20 of the seat pad 14 to move between the extended configuration and the retracted configuration.

The movable-seat pan 32 is configured to translate forward and aft relative to the seat pan 12 in the longitudinal direction 35 with the movable-pan mount 34 and includes a mount plate 39 and a seat-pad mover 41 as shown in FIG. 4. The mount plate 39 is coupled to the movable-pan mount 34 using a plurality of fasteners 43 that extend through complementary holes 45. The seat-pad mover 41 includes an outwardly facing surface 47 that is configured to engage and move the movable portion 20 of the seat pad 14 as the actuator 36 moves the movable-seat pad 32 and the movable-pad mount 34 relative to the seat pan 12.

The movable-pan mount 34 is engaged slidingly to the seat pan 12 between the movable-seat pad 32 and the seat pan 12. The actuator 36 causes the movable-pan mount 34, and in-turn the movable-seat pad 32, to translate relative to the seat pan 12 as suggested in FIG. 4 and shown in FIGS. 5 and 6. The movable-pan mount 34 includes a rigid portion 38 and a semi-rigid portion 40. In the illustrative embodiment, the rigid portion 38 is made from metallic materials such as, for example, steel. However, in other embodiments, any suitable material may be used to form the rigid portion 38. In the illustrative embodiment, the semi-rigid portion 40 is made of polymeric materials, such as, for example, polyethylene. However, in other embodiments, any suitable material may be used to form the semi-rigid portion 40.

The movable-pan mount 34 is formed to include a major guide slot 42, a first minor guide slot 44, and a second minor guide slot 46 as shown in FIGS. 5 and 6. The major guide slot is located in a central region of the movable-pan mount 34. The first and second minor guide slots 44, 46 are spaced apart from the major guide slot 42 along opposite lateral edges 50, 51 of the movable-pan mount 34. Each of the guide slots 42, 44, 46 are parallel with one another and extend in the longitudinal direction 35 from an aft end 52 of the movable-pan mount 34 toward a forward end 53 of the movable-pan mount 34.

Each of the guide slots 42, 44, 46 are configured to receive at least one guide pin therein as shown in FIGS. 5 and 6. The guide pins are configured to engage the seat pan 12 to couple the movable-pan mount to the seat pan 12. A first guide pin 54 and a second guide pin 56 are received within the major guide slot 42. A third guide pin 58 is received within the first minor guide slot 44. A fourth guide pin is received within the second minor guide slot 46. The first guide pin 54 is located forward of the second guide pin 56 and the first and second guide pins are axially aligned with one another in the longitudinal direction 35. The third and fourth guide pins 58, 60 are aligned with the second guide pin 56 along a lateral direction 37 that is perpendicular with the longitudinal direction 35.

The pad-extension system 16 is configured to restrict longitudinal movement of the movable-pan mount 34 and the movable-seat pan 32 relative to the seat pan 12 using the guide pins 54, 56, 58, 60. In the retracted configuration, the first guide pin 54 engages a forward end 62 of the major guide slot 42 to block further retraction of the movable-pan mount 34 relative to the seat pan 12. In the extended configuration, the second, third, and fourth guide pins 56, 58, 60 engage aft ends 64, 65, 66 of their respective guide slots 42, 44, 46 to block further extension of the movable-pan mount 34 relative to the seat pan 12. As such, in the illustrative embodiment, the pad-extension system 16 is self-limiting.

The movable-pan mount 34 is formed to include an aperture 64 that is configured to receive a portion of the actuator 36 as shown in FIG. 7. The aperture 64 is defined by forward wall 66, aft wall 68, and lateral side walls 70, 72. In the illustrative embodiment, the actuator 36 includes a rack 74, a pinion 76, and a motor 78 as shown in FIGS. 7 and 8. In other embodiments, a spindle gear actuator or a pneumatic actuator that includes one or more pneumatic bladders may be used in pad-extension system 16. The rack 74 is illustratively embodied as a series of teeth that are coupled to side wall 70 of aperture 64 and extend in the longitudinal direction 35. The pinion 76 is illustratively embodied as a gear having a plurality of teeth that are configured to engage and interlock with the rack 74. The pinion 76 is mounted for pivotable rotation about a pinion axis 80 by the motor 78. The pinion axis 80 is perpendicular to the longitudinal direction 35 and lateral direction 37.

The motor 78 is coupled to a bottom surface 82 of the seat pan 12, as shown in FIG. 8. The pinion 76 extends upwardly from the motor 78 through an aperture formed in the seat pan 12 and engages the movable-pan mount 34. As the motor 78 rotates the pinion 76, the pinion 76 moves the movable-pan mount 34 and the movable-seat pan 32 forward or aft in the longitudinal direction 37 as suggested in FIGS. 5 and 6.

The movable-seat pan 32 is formed to include a motor receiving aperture 84 formed in the seat-pad mover 41 as shown in FIG. 8. The motor-receiving aperture 84 is configured to receive the motor 78 when the pad-extension system 16 is arranged in the retracted configuration. The motor-receiving aperture 84 provides for greater adjustability of occupant-support base 10.

In some embodiments, the space 30 between the seat pan 12 and the seat pad 14 may be too small for various components with a thickness that is greater than the space 30. For example, the space 30 between the seat pan 12 and the seat pad 14 may be too small to fit a guide-rail and/or rollers for use in the pad-extension system 16. In other embodiments, the occupant-support base 10 may require space 30 to be minimized so that other components may fit within a package space of the occupant-support base 10. As such, the pad-extension system 16, in accordance with the present disclosure, is configured to minimize the space 30.

In the illustrative embodiment, the space 30 is defined as a thickness of the movable-seat pan 32 and the movable-pan mount 34 between the seat pan 12 and the seat pad 14. In another example, the space 30 is defined as a thickness of the movable-seat pan 32 and the pinion 76. In the illustrative embodiment, the space 30 is less than or equal to about 15 millimeters. In one example, the space is equal to about 12.75 millimeters.

A second embodiment of a movable-seat pad 232, in accordance with the present disclosure, is shown in FIG. 9. The movable-seat pad 232 includes a mount plate 239 and a seat-pad mover 241. The mount plate 239 is configured to be coupled to the movable-pan mount 34. The seat-pad mover 241 includes an outwardly facing surface 247 that is configured to engage and move the movable portion 20 of the seat pad 14 as the actuator 36 moves the movable-seat pad 232 and the movable-pad mount 34 relative to the seat pan 12.

The seat-pad mover 241 is illustratively a two-part assembly and includes a first shell 243 and a second shell 245 as shown in FIG. 9. The first shell 243 is coupled to the mount plate 239. The second shell 245 is configured to be coupled to the first shell 241 using fasteners 249 and/or tabs 251. The two-part assembly may facilitate manufacturing of the seat-pad mover 241.

The invention claimed is:

1. An occupant-support base comprising
a seat pan,
a seat pad coupled to the seat pan to define a space therebetween and adapted to support an occupant above the seat pan, and
a pad-extension system configured to move a movable portion of the seat pad relative to the seat pan between a retracted configuration in which the seat pad has a first occupant support length and an extended configuration in which the seat pad has a second occupant-support length that is greater than the first occupant-support length,
wherein the pad-extension system includes a movable-seat pan located in the space between the seat pan and the seat pad, a movable-pan mount located in the space between the seat pan and the seat pad, and an actuator coupled to the seat pan, and the movable-seat pan is fixed to the movable-pan mount such that the actuator causes the movable-seat pan and the movable-pan mount to translate relative to the seat pan in the space between the retracted configuration and the extended configuration,
wherein the actuator includes a motor fixed to bottom surface of the seat pan and a pinion mounted to the motor for pivotable rotation about a pinion axis and the pinion extends upwardly toward the seat pad, through the seat pan, and into engagement with the movable-pan mount,
wherein the movable-pan mount is formed to include a major guide slot positioned centrally on the movable-pan mount, a first minor-guide slot, and a second minor-guide slot spaced apart from the first minor guide slot to locate the major-guide slot therebetween, and
wherein at least one guide pin extends though each of the guide slots and each guide pin is fixed to the seat pan to restrict movement of the movable-pan mount relative to the seat pan.

2. The occupant-support base of claim 1, wherein the pinion axis is perpendicular to the movable-pan mount.

3. The occupant-support base of claim 2, wherein the space between the seat pan and the seat pad is about equal to a thickness of the pinion and the movable-seat pan.

4. The occupant-support base of claim 3, wherein the space is less than or equal to about 15 millimeters.

5. The occupant-support base of claim 3, wherein the space is equal to about 12.75 millimeters.

6. The occupant-support base of claim 1, wherein the movable-pan mount is formed to include a rack aperture separate from the major guide slot, the first minor-guide slot and the second minor-guide slot, the rack aperture being defined by a perimeter edge and a rack is coupled to the perimeter edge.

7. The occupant-support base of claim 1, wherein the guide pins include a first guide pin and a second guide pin that each extend through the major-guide slot, a third guide pin that extends through the first minor-guide slot, and a fourth guide pin that extends through the second minor-guide slot, and wherein the first guide pin restricts movement of the movable-pan mount past the retracted configuration and the second, third, and fourth guide pins restrict movement of the movable-pan mount past the extended configuration.

8. The occupant-support base of claim 1, wherein the movable-seat pan includes a mount plate coupled to the movable-pan mount and a seat-pad mover coupled to an end of the mount plate and configured to extend outwardly away from the occupant-support base in the extended configuration to increase the occupant support length of the seat pad.

9. The occupant-support base of claim 8, wherein the seat-pad mover includes a first shell coupled to the mount plate and a second shell coupled selectively to the first shell.

10. The occupant-support base of claim 9, wherein the second shell is formed to include a motor-receiving space and the motor is arranged to lie in the motor-receiving space when the pad-extension system is in the retracted configuration.

11. An occupant support comprising
a seat back,
a seat bottom including a seat pan and at seat pad spaced apart from at least a portion of the seat pan to define a space therebetween and adapted to support an occupant above the seat pan, and
a pad-extension system configured to move a movable portion of the seat bottom between a retracted configuration in which the seat bottom has a first occupant support length and an extended configuration in which the seat bottom has a second occupant-support length that is greater than the first occupant-support length,
wherein the pad-extension system includes a movable-seat pan located between the seat pan and the seat pad, a movable-pan mount located between the seat pan and the seat pad, and an actuator coupled to the seat pan, and the movable-seat pan is fixed to the movable-pan mount such that the actuator causes the movable-seat pan and the movable-pan mount to translate relative to the seat pan in the space between the retracted configuration and the extended configuration,
wherein the actuator includes a motor fixed to bottom surface of the seat pan and a pinion mounted to the motor for pivotable rotation about a pinion axis and the pinion extends upwardly toward the seat pad, through the seat pan, and into engagement with the movable-pan mount,
wherein the movable-pan mount is formed to include a major guide slot positioned centrally on the movable-pan mount, a first minor-guide slot, and a second minor-guide slot spaced apart from the first minor guide slot to locate the major-guide slot therebetween, and
wherein at least one guide pin extends though each of the guide slots and each guide pin is fixed to the seat pan to restrict movement of the movable-pan mount relative to the seat pan.

12. The occupant-support base of claim 11, wherein the pinion axis is perpendicular to the movable-pan mount.

13. The occupant-support base of claim 12, wherein the space between the seat pan and the seat pad is about equal to a thickness of the pinion and the movable-seat pan.

14. The occupant-support base of claim 13, wherein the space has a thickness less than about 15 millimeters.

15. The occupant-support base of claim 14, wherein the space has a thickness equal to about 12.75 millimeters.

* * * * *